Patented Nov. 9, 1926.

1,606,015

UNITED STATES PATENT OFFICE.

HENRY F. BLACKWELL, OF HIGHLAND, NEW YORK.

METHODS OF MAKING PLANT FOODS.

No Drawing.  Application filed April 21, 1922. Serial No. 555,880.

This invention relates to methods of making plant foods. The invention aims to supply the various elements required by plants in available water-soluble form such that they may be immediately absorbed and assimilated by the plants. A further object is to provide the various plant food elements separately in such available form so that by feeding to the plant different selected food substances the growth of the plant may be controlled in various ways, as by stimulating certain desired plant functions or lines of growth or development, stimulating the resistance of the plant to certain plant diseases, etc.

I have discovered that by inoculating peat or other suitable cellulose material with certain selected soil bacteria, i. e., the decomposing bacteria, and incubating the inoculated peat or other material until decomposition has taken place, and then washing out from the decomposed material the soluble products of decomposition of the material, there is obtained in the wash solution certain vegetable acids which will combine with various plant food elements to form water-soluble salts which are true plant foods, that is, which plants will absorb and assimilate, or if the cellulose material has mixed with it certain plant food elements the wash water as separated from the treated material will contain such salts.

I believe that in producing and supplying to the plants these water-soluble salts, I am following to a considerable extent the natural processes which occur in the soil and as the result of which the natural soil constituents and artificially supplied unavailable plant food substances are rendered available for plant growth. In the deposits or beds of vegetable matter which are found in various places and known generally as peat beds or humus beds, the humus material in the surface layers of a bed which has been cultivated for any considerable length of time consists principally of completely disintegrated and bacterially decomposed vegetable matter containing little, if any, cellulose, the water-soluble substances resulting from the bacterial action on the cellulose material having been removed. In the underlying portions of the bed, however, where bacterial action has been prevented by the presence of water, there is found the cellulose of the decayed vegetable matter, the material being in a more or less disintegrated condition but chemical decomposition not having taken place. The decomposed surface material which has lost its water-soluble substances I find to be useless for the production of available plant food according to my invention. Such material may be termed "spent humus". The material taken from such peat or humus beds for use in producing my plant food must be "unspent humus" taken from below the spent surface layers, that is, material in which cellulose is found in sufficient quantity. In place of humus material from such beds or deposits of decayed vegetable matter, I may use other more or less decayed or finely divided cellulose-containing vegetable matter, such as saw dust, the waste from the screens of wood pulp mills, the bagasse of the sugar centrals, cane field waste of leaves and tips of canes, tobacco stalks, cotton stalks, beet sugar pulp waste, and other kinds of vegetable waste obtainable at low cost and in sufficient quantity. The lignite found in the northwestern part of the United States is also available after some preliminary treatment.

As stated, the wash water solution which I obtain from humus or cellulose containing material decomposed by the action of bacteria contains a number of vegetable acids or salts of such acids. Such acids include humic acid, and for convenience I have used, and will hereafter in this specification and in the claims use, the terms "humic acid" as applying to all such acids, and "humate salts" as applying to all such salts. If the humus or cellulose material has combined with it one or more of the plant food elements when subjected to the decomposing action of the bacteria, the water soluble substances washed out therefrom will contain humate salts of such elements. If the material contains no such substances, then the wash water will contain humic acid uncombined with plant food elements, and the humic acid so obtained may be thereafter combined with desired plant food elements for producing desired salts, such as potassium humate, magnesium humate, iron humate, etc.

The direct production of the humate salts is the cheapest and best for producing products for general agricultural use. The indirect method of first producing the humic acid and then combining such humic acid with desired plant food elements to produce the desired humate salts has the advantage of enabling the desired salts to be produced as wanted for experimental or other work without going through the whole process for producing each separate salt or combination of salts wanted for use, and it also makes possible the production of more definitely proportioned combinations of different humate salts.

In carrying out the process, a suitable quantity, which may be large or small as desired, of peat or other suitable cellulose containing material inoculated with decomposing bacteria is incubated for a sufficient time to decompose the cellulose of the peat or other material. The material should be sufficiently moist for active development of the bacteria but should not be so wet as to keep out air, and the temperature should, most desirably, be maintained at about 80° F. As heat develops, the material should be turned occasionally to cool it or limit the heat development. After about six days usually, if conditions are favorable, the fibrous peat will have changed into a dark brown friable mass. Wash water is then added to dissolve out the soluble products of decomposition, the water being allowed to remain in contact with the whole mass for a sufficient short time to take up the soluble products. The water is then drained off into a settling tank or receptacle, and is thereafter, most desirably, filtered to remove suspended matter. Usually an amount of water about equal in volume to the inoculated material will be sufficient for taking up substantially all the soluble products of decomposition, but no exact proportionate amount of water need be used, and a larger amount than indicated may be used if desired. The solution thus obtained may be evaporated, preferably by the spraying or atomizing process, giving a product of humic acid or humate salt in the form of a dry amorphous powder which is readily soluble, non-hygroscopic and permanent. The insoluble material remaining after the soluble products of decomposition are thus washed out is a dark, nearly black, mass consisting largely of carbon and being practically identical with swamp muck or the spent humus above referred to, and useful for application to land to improve the physical condition of the soil, or as a filler for fertilizers and for other purposes.

If the peat or other cellulose material used does not contain plant food elements which will combine with the humic acid produced by bacterial action, the wash water solution will contain humic acid and will be without humate salts, but if one or more of the plant food elements are present in greater or less quantity in the cellulose material being treated, the wash water will contain a humate salt or salts in addition to some humic acid, or may contain merely the humate salt or salts and no uncombined humic acid.

For example, to produce potassium humate directly, a potash salt, such as potassium carbonate, is added to the cellulose material; or wood ashes may be added, in which case, as wood ashes contain lime and silica, the wash water will contain calcium and silicon humates in addition to the potassium humate. If ground calcined bone is added to the cellulose material, calcium phospho humate will be produced, and if ground raw phosphate rock is added, calcium phospho humate and calcium humate will be produced. The addition of a magnesium salt, such as magnesium carbonate, will result in the production of magnesium humate. The addition of lime will produce calcium humate; sodium silicate will produce silicon humate, and the addition of almost any iron salt will result in the production of iron humate.

To produce the humate salts indirectly from humic acid first produced by the bacterial decomposition of cellulose material, the same salts may be used, or salts of humic acid may be made to act on other salts to produce the desired humate salts by double decomposition. By either the direct or the indirect method, desired humate salts may be produced separately or combinations of two or more humate salts may be produced, but it is possible to produce more definitely proportioned combinations of humate salts by the indirect method. Ammonium humate may be produced by inoculating the cellulose material with the various nitro bacteria and ammonifying bacteria in addition to the decomposing bacteria. The nitro and ammonifying bacteria produce ammonia which combines with the humic acid to produce the ammonium humate.

The bacteria which I use for decomposing the cellulose material and which I mean by the term "decomposing bacteria" as used herein, are those bacteria which are found in fertile soil and which act to decompose the cellulose of vegetable matter present in the soil. Such decomposing bacteria will usually be found in peat or other cellulose material suitable for use in practicing my invention, so that for developing the same in the material it may be sufficient merely to subject the material to suitable incubating conditions of heat and moisture, but it is frequently, if not usually, desirable, and may in some cases be necessary, to inoculate the material with the desired bacteria. This may be done by adding to the material to be decomposed a small quantity of fertile soil containing considerable vegetable matter, such as the partly spent soil or humus from a peat bed or humus bed, or artificially prepared pure cultures of the desired bacteria may be employed for inoculating the material to be decomposed.

The humate salts or humic acid produced by my method may be distributed in liquid form, in which case the liquid solution is most desirably concentrated to a point just a little short of a saturated solution. I consider it better, however, to evaporate the solution, preferably by the spraying process, as before stated, and distribute the humate salts or humic acid in the form of a fine powder. Such powder may be used by applying the powder to the surface of the soil or by making a solution and sprinkling the same on the soil. If kept in a concentrated solution form, the solution is used by suitably diluting and spraying on the soil. The solutions of the humate salts and humic acid are permanent and do not ferment or putrefy. In powdered form the salts and the acid form dry amorphous powders which are permanent and non-hygroscopic, and may be distributed in fabric bags. The humate salts are stable and are not decomposed by substances usually present in the soil.

Important advantages of the present invention are that plant foods are provided which are immediately available to the plants and highly concentrated, and that by using such foods it is possible to supply plants and crops with desired food substances in readily regulated amounts. Chemical fertilizers, such as the so-called commercial fertilizers and the separate chemical plant food substances, when supplied to the soil are not immediately available as plant food. Before the potash, phosphorus, lime, magnesium and other elements can be absorbed and assimilated by the plants they have to undergo chemical changes in the soil which take greater or less time according to the condition of the soil, and more especially its condition with respect to its bacterial content; and they are consequently to a considerable extent leached down from the upper soil layers before such change takes place, with resulting waste of fertilizing material. The plant foods produced according to the present invention are immediately available to the plants when supplied to the soil, and it is possible to supply more exactly any desired quantity of any given food element. In addition to the direct advantage of having the material immediately available to the plant, there results also from this immediate availability a greater saving in material. The new plant foods of the present invention also effect a large saving in transportation and handling costs because of the greatly reduced weight and bulk of material to be transported and handled.

What is claimed is:

1. The method of preparing a water-soluble humic acid salt plant food, which comprises adding to vegetable matter a basic plant food element unavailable to plants, thereafter decomposing the vegetable matter by means of decomposing bacteria whereby humic acid is formed which combines with the basic plant food element to form a water-soluble humic acid salt, and removing the water-soluble product of such decomposition and combination.

2. The method of preparing a water-soluble humic acid salt plant food, which comprises decomposing vegetable matter by means of decomposing bacteria, adding a basic plant food element unavailable to plants to the vegetable matter to combine with humic acid formed by the decomposition, adding water to the decomposed material to form a solution of the water-soluble products, and separating the solution from the insoluble material.

3. The method of preparing a water-soluble humic acid salt plant food, which comprises decomposing vegetable matter by means of decomposing bacteria, and combining the water-soluble product of such decomposition with a basic plant food element unavailable to plants to form a water-soluble humic acid salt available to plants.

4. The method of preparing plant food consisting of a mixture of water-soluble salts of humic acid, which comprises decomposing vegetable matter by means of decomposing bacteria, adding a plurality of selected basic plant food elements unavailable to plants to the vegetable matter to combine with humic acid formed by the decomposition to produce a mixture of water-soluble humic acid salts of said selected elements, and removing the water-soluble product of such decomposition and combination.

5. The method of preparing plant food consisting of a mixture of water-soluble salts of humic acid, which comprises decomposing vegetable matter by means of bacteria, and combining the water-soluble product of such decomposition with a plurality of selected basic plant food elements unavailable to plants to form a mixture of water-soluble humic acid salts of said selected elements.

In testimony whereof I have hereunto set my hand.

HENRY F. BLACKWELL.